Nov. 20, 1951 — E. K. THOMPSON — 2,575,985
FARM SEEDER
Filed May 10, 1950
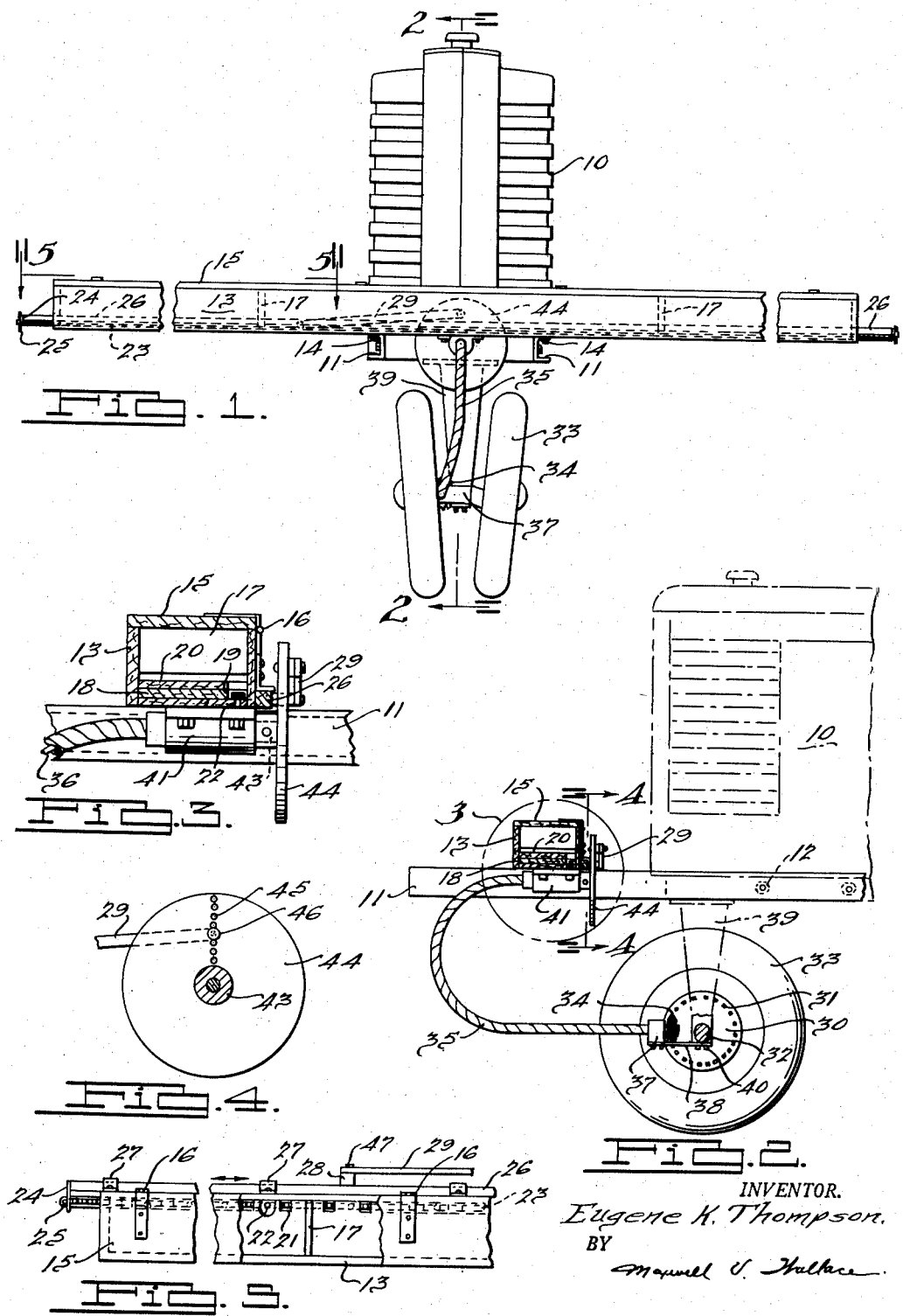
INVENTOR.
Eugene K. Thompson.
BY
Maxwell J. Wallace
ATTORNEY.

Patented Nov. 20, 1951

2,575,985

UNITED STATES PATENT OFFICE 2,575,985

FARM SEEDER

Eugene K. Thompson, Tecumseh, Mich.

Application May 10, 1950, Serial No. 161,104

1 Claim. (Cl. 275—2)

This invention relates to seeders and more particularly to a new and improved seeder attachment for tractors whereby there is provided a durable light-weight seeder attachment that can be readily mounted on the front of a tractor and to also provide a simple and efficient quick attachable and detachable driving connection between a power take-off and the seeding mechanism.

The principal object of the present invention is to provide a new and improved seeder for broadcasting brome grass seed, or the like, the uniform distribution of which is effective under forward movement of a tractor.

The above and other objects will appear more fully from the following more detailed description, and from the drawing, wherein:

Fig. 1 is a front elevational view of the seeder showing the same secured to the forward portion of a farm tractor.

Fig. 2 is a sectional view taken substantially on line 2—2 of Fig. 1.

Fig. 3 is an enlarged sectional view taken inside circle shown in Fig. 2.

Fig. 4 is a sectional view taken substantially on line 4—4 of Fig. 2; and

Fig. 5 is a view taken substantially on line 5—5 of Fig. 1.

Referring now to the drawing, the numeral 10 designates a well-known farm tractor. Secured to the tractor frame are a pair of channel iron members 11, the same being held rigidly in place by means of bolts 12, said channel members being opposed, as shown in Fig. 1, and the same are placed to extend out beyond the radiator of the tractor, as shown best in Fig. 2. Detachably secured to channels 11, by means of bolts 14, is a hopper 13, the same comprising a box-like structure having a lid 15 hinged as at 16, said hopper being approximately sixteen feet in length and having bracing members 17 spaced equi-distant, the entire length of the hopper. Superimposed upon the bottom of the hopper 13 is a plank member 18, said plank being of lesser width than the bottom of the hopper, the same being fitted into the hopper to form a trough 19, approximately two inches wide, said trough running the entire length of the hopper. Superimposed upon plank 18 is another floor member 20, said floor member covering the entire bottom of said hopper and having therein a plurality of openings 21, Fig. 5, opening into trough 19, the same being spaced apart and running the entire length of the hopper 13. The bottom of the hopper contains a plurality of holes 22, the same being bored near the back of the hopper into trough 19, but are so spaced that they are not in alignment with openings 21 in top floor of hopper bottom. A chain 23 runs the entire length of the hopper and nests within trough 19, the ends of the chain extending through openings in the ends of the hopper and are secured by means of cotter pins 25 to brackets 24, which in turn are secured to each end of a rod member 26 which runs the entire length of the hopper on the outside back of same, being held thereon by means of brackets 27, said brackets being of a size to allow free longitudinal movement of said rod member 26. Rod member 26 has secured thereto a stud member 28 to detachably receive link member 29.

A disc 30, Fig. 2, having a plurality of holes 31 near the circumference thereof, is keyed to axle 32 upon which front guide wheels 33 of tractor 10 are mounted. A spur gear 34, whose teeth are adapted to engage holes 31 in disc 30, is connected rotatably to one end of a flexible tube 35, said tube containing the usual spring member 36, said tube 35 being journaled by means of bearing member 37 which in turn is supported upon a bracket member 38 secured to guide wheel supporting members 39 by means of bolts 40. The other end of flexible tube 35 is connected to a bearing box 41 which is secured to bottom of hopper 13. A stud shaft 43 is mounted within said bearing box 41 and has rotatably mounted thereon a disc 44, said disc having formed radially therein a plurality of openings 45, adapted to receive a pin member 46 to secure one end of link member 29 to disc 44. The other end of link member 29 having a pin member 47 by which it may be quickly secured to stud 28 when it is desired to operate hopper member 13.

The manner in which the device operates is as follows:

When the user wishes to seed a field he first makes sure that the link 29 is disconnected from stud 28, by removing pin 47, so that rod member 26 will not be oscillated when the tractor is in motion, i. e., until the tractor reaches the field to be seeded, which is usually some distance from where a tractor is stored. Hopper 13 is first filled with the desired type of seed to be used, and this is usually done near the barn where the seed is stored. If it is necessary to pass through a farm gate in order to reach the field to be seeded, with the large sixteen foot hopper attached to the tractor in its normal seeding position, the user has simply to remove one bolt, such as either of bolts 14, Fig. 1, which allows the hopper 13 to be swung to a diagonal position in relation to the tractor and the entire tractor and hopper may then be passed through an ordinary farm gate without trouble. When the field to be seeded is reached, the user simply returns hopper 13 to its normal seeding position, as shown in Fig. 1, and returns bolt 14 to hold it in place upon the channel members supplied therefor. Link 29 is then secured to stud 28, by means of pin 47, Fig. 5, and the tractor started forward. As the tractor moves forward and guide wheels 33 rotate upon axle 32 to which disc 30 is secured, disc 30 rotates in a contra-clockwise direction. Inasmuch as spur gear 34 is so located that the teeth thereof mesh with the openings 31 in disc 30, spur gear 34 is also rotated in a clockwise direction, and this movement is imparted, by means of flexible tube 35, to which one end of spur gear 34 is secured, to gear box 41 and to disc 44 mounted on shaft 43, causing disc 44 to rotate in a clockwise direction. One end of link 29 is secured, by means of pin 46, to disc 44 through one of the openings 45 therein, and the other end of link 29 is secured to stud 28 on rod member 26. As disc 44 rotates link member 29 causes rod member 26 to oscillate, which in turn moves chain 23, each end of which is secured to an end of rod member 26. The distance rod member 26 oscillates is controlled by the opening to which one end of link 29 is secured to disc 44. When connected to an opening near the circumference of disc 44 there is a long stroke produced and the nearer to shaft 43 the link member is placed, the shorter the stroke of rod member 26.

Inasmuch as chain 23 is lodged in trough 19 into which seed is dropped through openings 21 in hopper 13, the oscillation of chain 23 causes the seed to be moved back and forth in trough 19 until it falls through holes 22, which are not in alignment with openings 21 so that the seed will not drop on through too fast from hopper 13. The hopper being at least sixteen feet long the time element is greatly aided in seeding a field. If the user wishes to seed a field quickly he has simply to shorten the stroke of rod member 26 by placing one end of link 29 near shaft 43 of disc 44 and this will cause quick oscillation of rod member 26 and cause the seed to be spread thick and fast. A longer stroke of rod member 26 will cause a more gentle distribution of seeds and much thinner coverage of the ground being sown.

There has been disclosed herein a simple, yet unique mechanism, whereby a farmer may quickly convert his tractor to a seeder by a few simple changes. The large hopper may be quickly detached from its carrying channel members and the tractor used for many purposes without in any way disturbing the hopper driving mechanism.

While I have described and illustrated a satisfactory device that has proven highly successful in practical operation, it will be understood that the invention is not limited to specific constructional details shown and described, but that many changes, variations and modifications may be resorted to without departing from the principles of my invention.

I claim:

A farm seeder for use in combination with a tractor having a pair of front guide wheels, comprising a feed hopper mounted upon front supports from said tractor, said hopper having material discharge openings at spaced points in the bottom thereof, a trough formed within said hopper, a superimposed floor within said hopper having spaced openings therein leading to said trough, a rod member slidably mounted upon the back of said hopper, a chain located within said trough below said openings in said superimposed floor, the ends of said chain being secured to the ends of said slidable rod, means to actuate said rod for reciprocating said chain relative to said hopper, comprising a disc member mounted upon the axle of said front guide wheels, a spur gear in mesh with said disc, a flexible cable having one end thereof secured to said spur gear and the other end thereof to a bearing box secured to said hopper, a disc member having a plurality of radially spaced openings therein rotatably mounted upon said bearing box and rotated by said cable, and a link member connecting said last mentioned disc and said rod member to impart oscillatory movement to said rod.

EUGENE K. THOMPSON.

REFERENCES CITED

The following references are of record in the file of this patent:

UNITED STATES PATENTS

| Number | Name | Date |
|---|---|---|
| 16,511 | Wooding | Jan. 27, 1857 |
| 739,347 | Rowell | Sept. 22, 1903 |
| 896,178 | Tuttle | Aug. 18, 1908 |
| 1,117,027 | Gelink | Nov. 10, 1914 |
| 1,751,928 | Lachner | Mar. 25, 1930 |
| 2,219,505 | Pierson et al. | Oct. 29, 1940 |
| 2,416,804 | Ulrich | Mar. 4, 1947 |